United States Patent [19]

Wachspress

[11] 3,875,932

[45] Apr. 8, 1975

[54] AUDIOTACTILE STIMULATION AND COMMUNICATIONS SYSTEM

[76] Inventor: How F. Wachspress, 1940 Washington St., San Francisco, Calif. 94109

[22] Filed: Mar. 2, 1973

[21] Appl. No.: 337,719

[52] U.S. Cl. ............................ 128/24 R; 179/107 R
[51] Int. Cl. .............................................. A61h 1/00
[58] Field of Search ........ 128/1 R, 24 R, 32, 38–40, 128/41; 3/1; 179/107 BC, 107 R

[56] References Cited
UNITED STATES PATENTS

| 592,844 | 11/1897 | Waite | 128/41 UX |
|---|---|---|---|
| 1,077,096 | 10/1913 | Rosenberg | 128/41 |
| 2,652,048 | 9/1953 | Joers | 128/39 |
| 3,259,205 | 7/1966 | Dubow | 179/107 BC |

Primary Examiner—Lawrence W. Trapp
Attorney, Agent, or Firm—Gregg, Hendricson & Caplan

[57] ABSTRACT

Random or controlled electronically synthesized signals are converted to sound waves that are directly coupled to the skin of a life form, such as a human body, to stimulate the skin or internal portions of the life form and to communicate the intelligence, sense or feeling of the sound to the brain, bypassing the ear as the channel for reception of audio information. Control signals are derived from biopotentials or other sources, to modulate an electronic synthesizer. The amplified signals then drive an electroacoustic transducer which directs the sound waves through a wave guide to a probe adapted to couple the sound directly to the skin of a life form with a minimum of acoustical radiation. Recording, reproduction, analysis, synthesis or communication systems employing such instrumentation and related software.

14 Claims, 10 Drawing Figures

AUDIOTACTILE STIMULATION AND COMMUNICATIONS SYSTEM

BACKGROUND OF INVENTION

It is known that there is a certain amount of interchangeability between information or sensation that may be received by the different senses of a human body, for example. To a certain extent the human body compensates a dificiency of one sense by an overdevelopment of another as, for example, by the increased sensitivity of the human ear of a person having sight deficiencies. At least limited experimentation has been made in this general field and also in synesthesia phenomena. Certain experimentation has also been carried on in connection with the response of life forms to sound waves.

It is known that certain parts of the human body, for example, are resonant at particular frequencies in the audio range and it has been proposed to couple sound waves directly to the skin of the human body and also to internal parts such as organs, joints and muscles.

Certain specific developments have been made in the use of skin or flesh to receive information. Thus, for example, a system has been developed for the application of pressure to different portions of the back of a pilot to advise the pilot of the orientation of his plane in space. There have additionally been developed a wide variety of different types of vibrating mechanisms for use with the human body, generally for therapeutic purposes. It is also known to directly apply electrical signals to the skin of the head for transmitting intelligence to the brain as a substitute for the human ear in combating deafness.

The present invention provides for the direct coupling of low frequency high pressure sound waves to life forms such as the human body for a variety of purposes including sensory substitution, the generation of body music, pleasure stimulation, biopotential feedback, the attainment of sensory capacities by the suppression of dominant sensory input, physiotherapy, the generation of a new media for new perceptions and as a part of multimedia experiences.

SUMMARY OF INVENTION

The present invention provides for the application of low frequency high pressure sound waves directly to the body, either internal or external, preferably by a close coupling of the sound waves to the skin of the body. The applications of the present invention are quite broad and thus the type of message transmitted to the body may widely vary as generally indicated above. In order to facilitate description of the present invention the sound waves will be considered to contain a "message " which might, for example, be music or intelligence in the way of instructions or information, for example. In addition to the foregoing examples, the message conveyed by the present invention may be alternatively directed to the accomplishment of particular responses in manners not hitherto contemplated not achieved. Thus, for example, it has been found that the proper application of a musical message to the skin of the body brings about a response which may be termed "body music" that may substantially differ from the normal body response to music received through the ear.

The present system employs some type of message generator which may be an electronic signal generator, or, for the purposes hereof, be considered merely as prerecorded music on tape, for example, or, as another example, might originate from the biopotentials of the head of a human being. In general the message signals are employed herein as electrical signals which are then synthesized as, for example, to modulate a carrier. These synthesized signals are then applied to an audiotactile transducer. Such a transducer may comprise a coil-driven diaphragm mounted on an intermediate baffle, in turn mounted in a baffle container. An acoustic wave guide extends into the container into engagement with the intermediate baffle adjacent the diaphragm for the direction of high pressure sound waves along the wave guide to an appropriate termination for close coupling of such waves to the skin of life forms such as the skin of human body. This coupling may be accomplished to the exterior or interior skin or internal part of the body and the various openings in the body are available for interior coupling.

The present invention furthermore contemplates the utilization of both frequency modulation and amplitude modulation of a basic or carrier sound wave and other signal processing techniques and furthermore incorporates multichannel systems wherein a plurality of message signals may be combined to achieve particular, more complex responses. It will also be noted that the synthesized electrical signals may be broadcasted and received at a distance for application to the audiotactile transducer so that substantial physical separation between the location of message generation and single or multiple message application is possible.

In the absence of an existing term, the word "teletac" is herein taken as a generic word for communication of stimulation systems employing the skin of a life form.

DESCRIPTION OF FIGURES

The present invention is illustrated as to preferred embodiments thereof in the accompanying drawings wherein.

DESCRIPTION OF PREFERRED EMBODIMENTS

Figure 1:
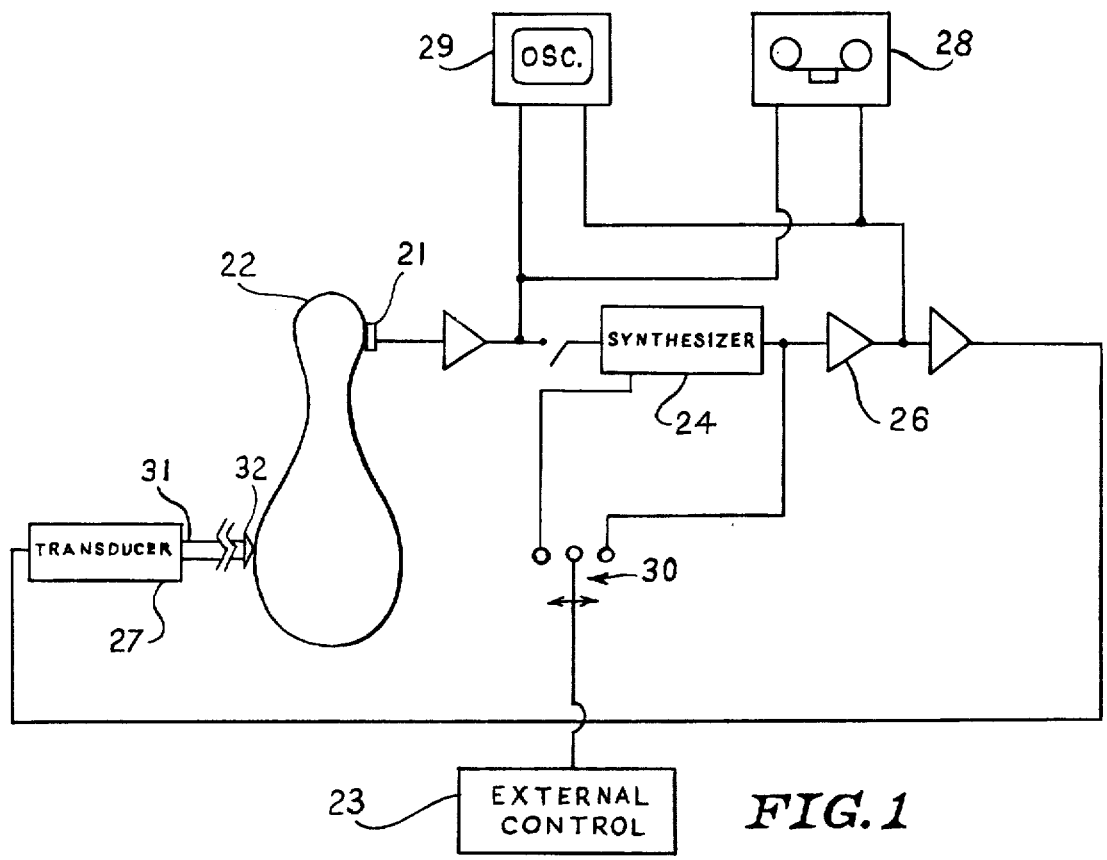
FIG. 1 is a schematic illustration of one embodiment of the present invention.

The system of the present invention provides for the generation of electrical signals from a wide variety of sources which are employed to produce acoustic or sound waves in accordance herewith. In FIG. 1 there is illustrated a signal detector 21 which may be attached to a life form such as a human body or the like 22 to produce biopotentials resulting from activity of one sort or another of such life form and which may include a biopotential amplifier. Other types of signal generators or external control means 23 may be employed herein as, for example, a keyboard, a ribbon controller, voltage control, prerecorded signals, radio or wire transmitted signals or random signals. The signals, from whatever source, are applied to a synthesizer 24 which is controlled either from the detector 21 or signal generator 23 to produce electrical signals applied to amplifiers 26 having the output thereof connected to a transducer 27. Provision may be made in the system for recording the signals as indicated at 28 and also for visually displaying both the originating signals and the synthesized signals, as indicated at 29. Switching means 30 provide the capability of employing the generator 23 either as the synthesizer input or as a source of synthesized signals which may, for example, be recorded on tape from prior experiences. The transducer 27, as described below, produces an acoustic output along an acoustic wave guide or transmission line 31 to probe means 32 adapted for close coupling with a life form such as a human body for the application of sound Waves to such life form.

Figure 2:
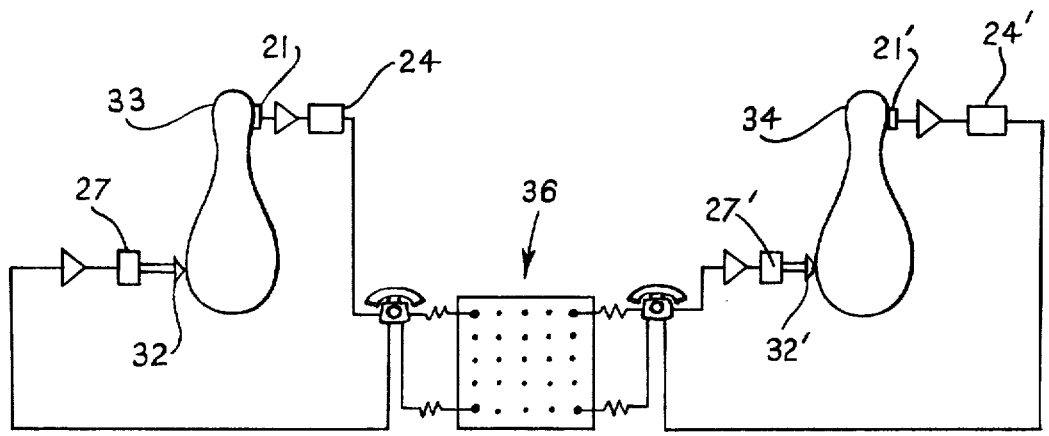
FIG. 2 is a schematic representation of a multiple party system in accordance with the invention.

In FIG. 2 there is illustrated a communication system in accordance with the present invention for interconnecting two life forms 33 and 34. Each of these life forms are provided with biopotential sensors and synthesizers as in FIG. 1 with the output of the synthesizer 24 being connected as, for example, through a telephone line matrix 36 to the transducer 27' and probe 32' attached to the life form 34. Similarly the synthesizer 24' of the life form 34 is connected back through this same matrix system 36 to the transducer 27 and probe 32 engaging the life form 33. This then forms a closed loop system including two life forms such as two human beings for accomplishing audiotactile experiences therebetween. The matrix 36 includes some type of transmission system such as a telephone system or radio broadcast system and this concept may also be employed with alternative signal sources.

Figure 3:
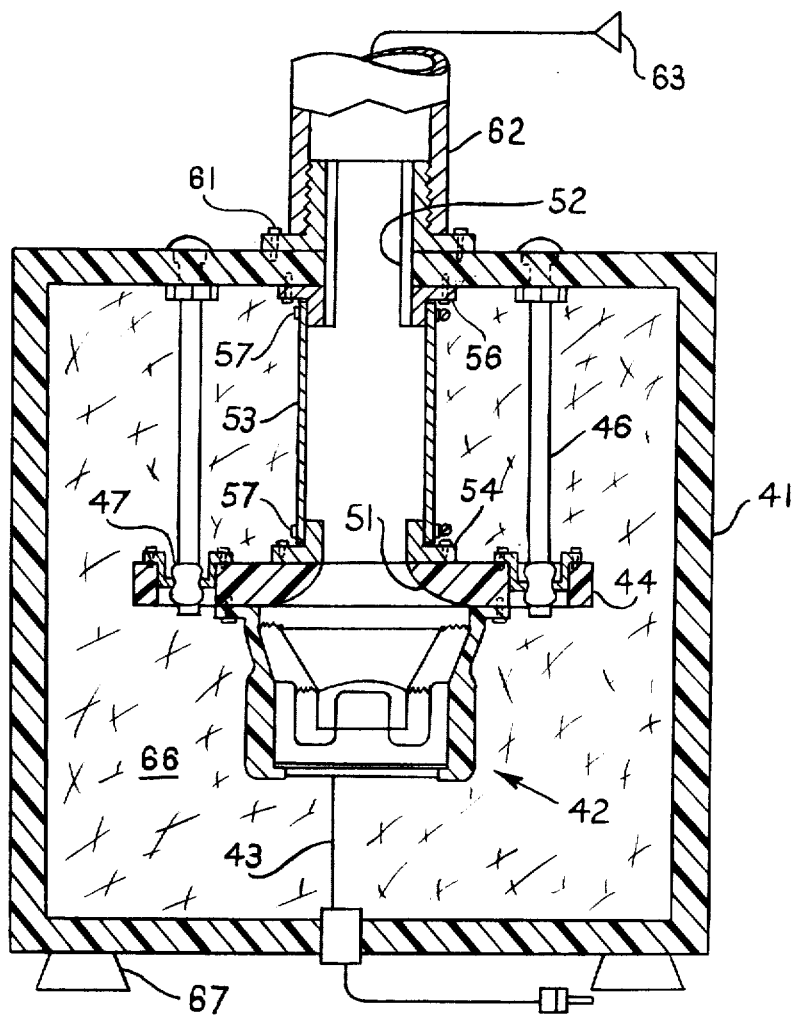
FIG. 3 is a central elevational sectional view of an acoustic tectile transducer in accordance with the present invention.

Referring now to FIG. 3, there is illustrated an acoustic transducer in accordance with the present invention and including a container or housing 41 formed of a material or composed of a multiplicity of materials which do not readily transmit sound, such as, for example, a composition board. Within this housing there is disposed a sound wave generator 42 commonly incorporating a movable diaphragm and electrically energized coil to the end of producing diaphragm movements in response to electrical signals. The application of electrical signals to the generator 42 is schematically illustrated in FIG. 3 by an electrical conducting cable or conductors 43. The generator 42 is physically mounted upon an internal or secondary baffle plate 44 within the container 41 by means of a plurality of mounting bars 46, as illustrated in FIG. 3. These mounting bars may, for example, be physically affixed to the interior of the top of the container 41 to depend therefrom and to be physically connected to the internal baffle 44 by vibration isolation mounting means 47. Vibration-less mounting means 47 may be of the type known in the art and serve primarily to limit the transmission of acoustic waves from the internal baffle 44 to the exterior baffle or container 41.

The generator 42 is noted to be mounted on the underside of the baffle plate 44 in position to generate sound waves directed toward the baffle plate. Provision is herein made for directing these sound waves exteriorly of the transducer by the provision of an opening 51 in the baffle plate 44 immediately above the center of the diaphragm of the generator 42 so that sound waves will be transmitted through the opening in the baffle 44. An opening 52 is also formed through the housing or container 41 directly above the opening 51 and a rubber hose or the like 53 extends between these openings within the container 41. Fittings 54 and 56 are provided on the baffle 44 and interior of the housing or container 41 about the openings through these two elements with the tube or hose 53 slipped over these fittings and secured thereto as by hose clamps 57.

Exteriorly of the housing 41 there is provided a fitting 61 about the opening 52 in the housing and a flexible acoustical transmission line 62 is attached to this fitting and extends to a probe 63. The transmission line 62 may, for example, be formed of rubber tubing and the probe may be provided in a variety of different configurations and formed of different materials such as plastic or rubber, as further discussed below.

The interior of the housing 41 is preferably filled with acoustic insulation such as Fiberglas insulation 66; however, the sound generator 42 is air coupled through the opening 51, to tube 53, and opening 52 into the acoustic transmission line 62. The enclosure or housing is tightly sealed and it is preferably provided with shock mounting such as rubber legs 67. The acoustic transducer described above directs relatively high pressure, low frequency sound waves through the transmission line 62 with very limited acoustical radiation from either the enclosure 41 or the transmission line itself. It may be considered that the generator or driver 42 is backloaded into the same enclosed volume as if it were mounted on the main baffle or enclosure and front-loaded into the same front volume. It is, however, noted that the subassembly including the driver and baffle 44 is decoupled from the enclosure and in effect is a loaded enclosed volume enclosed inside iteself. The main baffle serves as a separate acoustical insulating housing. There is thus provided by this transducer a highly efficient sound generator particularly suited for utilization in the system of the present invention.

Figure 4:
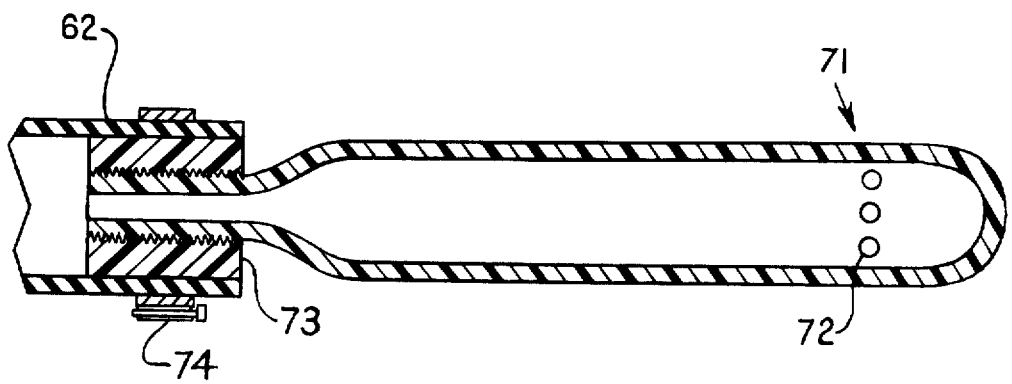
FIG. 4 is a central longitudinal sectional view of an internal probe that may be employed with the present invention.

It has been noted above that the system of the present invention is adapted to closely couple particular sound waves to the skin of a life form such as a human body. This coupling may be accomplished either internally or externally of the body and thus a wide variety of different coupling means may be employed. These coupling means are herein termed probes merely for convenience of nomenclature and in FIG. 4 there is illustrated an internal probe 71 which may, for example, be formed of a thin plastic in the form of an elongated hollow cylinder with a smoothly curved outer end closing such end. The probe 71 is attached to the transmission line 62 as by threaded engagement with a fitting 73 that is clamped in the end of the line as by a clamp 74. The probe 71 extends longitudinally from the end of the line 62 and thus receives the sound waves propagated therethrough. The probe 71 is provided with a series of apertures 72 thereabout for coupling sound waves out of the probe and into the skin of a life form in which the probe is inserted.

Figure 5:
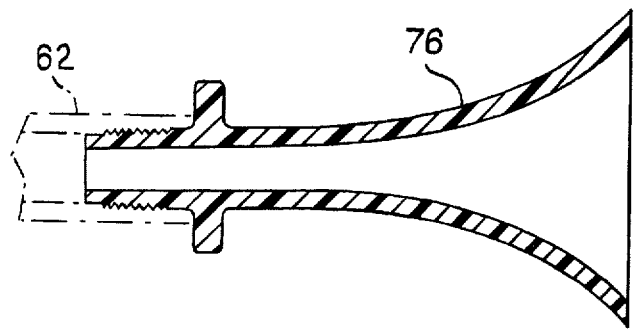
FIG. 5 is a sectional representation of an external probe that may be employed with the present invention.

It will be appreciated that the physical configuration and size of the probe employed to couple sound waves to the body varies in accordance with the particular application. Thus various sized and shaped internal probes may be employed and likewise external probes of varying size and shape may be utilized. In FIG. 5 there is generally illustrated an external probe which may, for example, take the form of a horn or the like 76 formed of molded rubber, for example. At the throat of the horn there is provided an opening to which the transmission line 62 is attached so that sound waves transmitted through the line are directed into the throat of the horn. Such sound waves then are directed by the flaring surfaces of the horn to the large open end thereof for application to the exterior skin of a human being, for example. It is noted in this respect that, while it is desirable to closely couple the sound waves of the present invention to the human body, it is not always necessary to directly contact the probe with the skin. A slight separation of probe and skin will yet result in the sound waves from the horn of FIG. 5, for example, being coupled to the skin, although, of course, decoupling increases with increasing separation of probe and skin. It is further noted in this respect that very tight coupling of probe and skin facilitates the coupling of audio waves into internal portions of the body such as organs, muscle, flesh, bones and joints. Such sound application is advantageous for various applications of the present invention.

Figure 6:
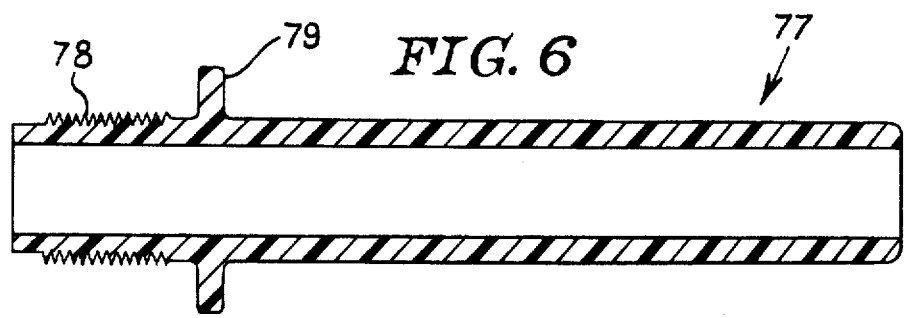
FIG. 6 is a central longitudinal sectional view of a further probe embodiment of the present invention.

There is illustrated in FIG. 6 a further embodiment of an acoustic probe suitable for use as an internal or external probe in the present invention. It will be seen that the probe of FIG. 6 comprises a hollow cylinder 77 open at both ends and adapted at one end for connection to a sound wave guide. This connection may be facilitated by the provision of external threads 78 about one end of the probe and an external flange 79 about the inner ends of these threads so that the wave guide may be readily connected to the probe. This particular probe is adapted primarily for internal use and will be seen to direct the sound waves out of the open end thereof. This probe may be formed of plastic, molded rubber, or the like, having sufficient rigidity for insertion and being formed of a suitable size to fit the particular life form orifice within which it is to be employed. The probe may be employed externally merely by placing the open end thereof against the skin as the sound waves are coupled out of this open end.

There has been described above one embodiment of an acoustic tactile transducer or audiotactile transducer; however, it is noted that numerous modifications and variations thereof are possible. The transducer illustrated in FIG. 3 and described above is a pneumatic device wherein air or gas is employed to transmit sound waves. Obviously, alternative transmission media may be employed and similarly alternative physical constructions are possible. In this respect reference is made to FIGS. 7 and 8 of the drawings wherein there is illustrated a housing 81 which may, for example, be formed of molded Fiberglas or the like having an internal flange 82 extending about the interior thereof and an opening in the top which may be closed by the plate 83 secured to the housing. Within the housing there is disposed a subassembly 84 comprising a cup-shaped container 86 also formed, for example, of molded Fiberglas, and having an internal flange 87 thereabout for mounting of a moving coil device 88. This device 88 is adapted for electrical energization to move an external piston 89 against a diaphragm 91 disposed across the top of the container 86 and sealing the interior of the container. Electrical energization of the device 88 is provided via an electrical cable 92 extending through the container 86 and also through the exterior housing 81 to a coupler 93 for connection to electrical synthesizing circuitry as described above.

As a further portion of the subassembly 84 there is provided a cap or top 94 formed as a flared horn having the large end disposed downwardly with the periphery thereof adapted to tightly engage the rim of the cup-shaped container 86 in sealing relation thereto. The horn 94 carries the diaphragm 91 which is formed of a flexibly resilient material such as thin rubber or the like so as to be readily deflected by the piston 89 and to at all times remain in contact with the curved upper surface of this piston. At the small upper end of the horn-shaped cap 94 there is provided a connector 96 which joins the cap to a flexible wave guide tube 97 that, in turn, extends through a central opening in the top closure plate 83 via mounting means 98. The outer surface of the tube 97 and inner surface of the mounting means 98 may be roughened at the areas of contact thereof for tight closure of the interior of the housing 81.

In this embodiment of the audiotactile transducer there may be employed a liquid such as water 99 for the transmission of sound waves and such liquid is disposed in the horn-shaped cap 94 above the diaphragm 91 extends through the tube 97. Within the container 86 the device 88 is surrounded by air under at least some pressure so that the diaphragm 91 is backloaded by this air pressure as well as being forward loaded by the liquid extending from the diaphragm through the tube 97 to some type of probe, as discussed below. It will be appreciated here that forward and back loading of the sound generating diaphragm is necessary and the spring action of the air in the container 86 is designated to substantially equal the spring action at the end of the probe to be connected to the tube 97 for relatively equal forward and back loading of the diaphragm. It is also noted that in hydrostatic systems provision is generally made for some type of accumulator or the like; however, the probe itself is generally satisfactory for this purpose.

Figure 7:
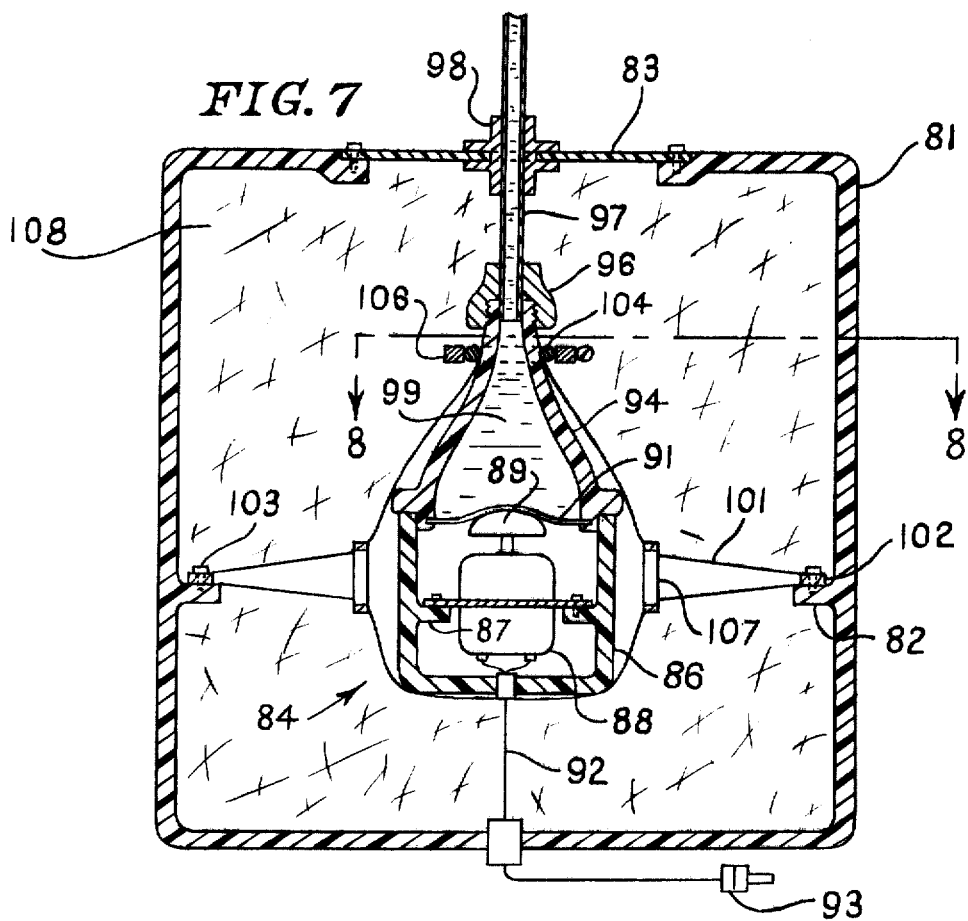
FIG. 7 is a central sectional view of an alternative acoustic tactile transducer in accordance with the present invention.
Figure 8:
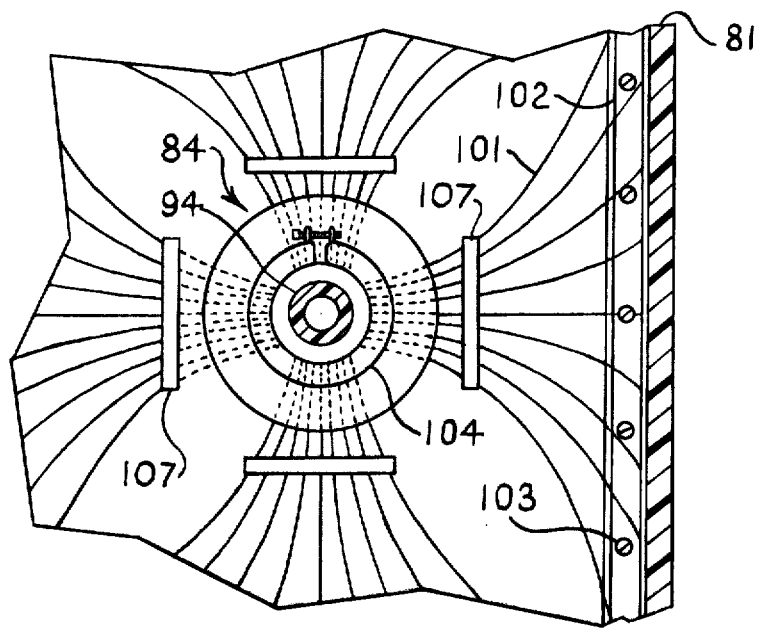
FIG. 8 is a partial sectional view taken in the plane 8—8 of FIG. 7.

Provision is made in the transducer of FIG. 7 to prevent the coupling of sound waves to and/or through the housing 81 as it is desired that as much of the sound wave energy as possible be directed through the wave guide tube 97. To this end the subassembly 84 is mounted by means of an elastic fiber net formed of fibers 101 wound about a frame 102 which is mounted on the internal flange 82 of the housing 81 as by bolts 103. These fibers terminate at and are connected to or wound about a resilient ring 104 at the top of the net which may be stretched open far enough for the subassembly 84 to be inserted through the ring and then released to resume a configuration such as illustrated in FIG. 7 bearing against the inwardly tapering portion of the horn-shaped cap 94. The resilient ring 104 may be retained in the position illustrated in FIG. 7 by a metal ring 106 fitted about the resilient ring and clamping the latter against the cap 94. In order to draw the fibers 101 of the support net tightly against the subassembly 84 there are provided a number of resilient collars 107 through which the fibers of the net extend and which may be slipped along the fibers toward the subassembly to thus draw these fibers tightly against the subassembly, as illustrated in FIG. 7. This then improves the stability of the subassembly as mounted in the housing 81. It will be appreciated that, by this mounting, the connection of subassembly to housing is primarily accomplished through resilient threads or fibers which do not substantially transmit vibration or sound wave so that, consequently, a relatively vibration-free mounting is accomplished. There is also provided within the exterior housing 81 a loose packing 108 of Fiberglas fibers, for example, serving as sound absorbing material between the subassembly and the housing 81.

Figure 9:
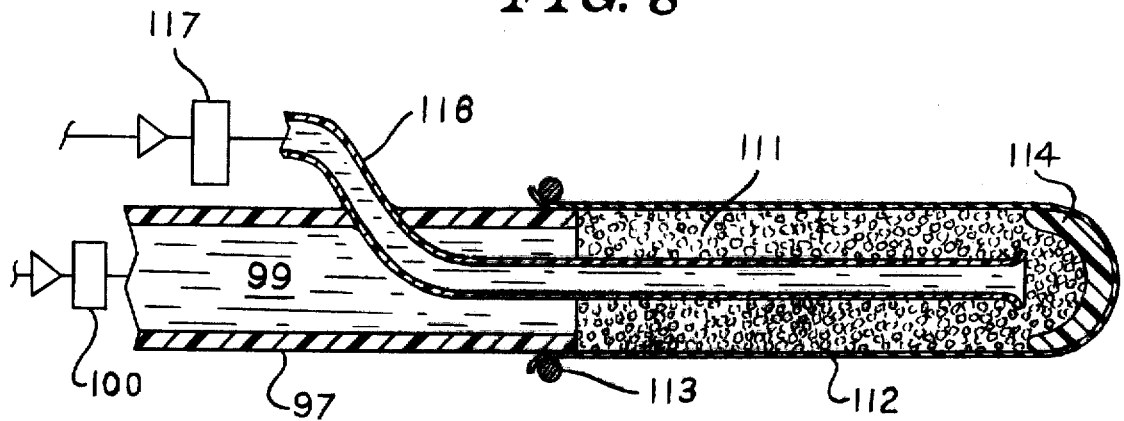
FIG. 9 is a central longitudinal sectional view of a multichannel internal probe in accordance with the present invention.

There is illustrated in FIG. 9 a multichannel interior probe that may be employed with the present invention. As previously discussed, the present invention is adapted to the application of audio waves to the body of a life form and these sound waves may be applied from a single source or a multiplicity of sources, such as two or more sources. In FIG. 9 there is illustrated a multichannel probe that may, for example, be employed with a pair of acoustic tactile transducers such as illustrated in FIG. 7. At the left of FIG. 9 there is illustrated the flexible tubular sound wave guide 97 of FIG. 7 containing a liquid 99, such as water, and terminating in a cellular liquid-pervious cylinder 111 extending from the open end of the tube 97 and closing same. The wave guide 97 connects to a transducer 100. The outer end of this cylinder 111 is semispherical, as illustrated, and the cylinder is preferably enclosed in a membrane 112 provided for the purpose of matching impedance with skin to be contacted internally of a human being, for example, and formed, for example, of very thin multilayered rubber. This membrane may be retained in position by retainer ring 113 about the outer end of the tube 97, as illustrated.

On the outer semispherical end of the cylinder 111 beneath the membrane 112 there is secured a hemispherical reflector 114 formed, for example, or molded plastic. There is additionally provided as a portion of the probe of FIG. 9 a second flexible sound wave guide tube 116 extending through a side wall of the tube 97 and also extending out the end of this tube 97 axially through the cylinder 111 to terminate a short distance from the semispherical outer end of the cylinder. This tube 116 is also filled with a liquid and extends from a second audiotactile transducer 117 so as to transmit sound waves through the liquid medium carried by the tube whereby such sound waves are directed out the open end of the tube 116 against the center of the reflector 114 so as to be reflected back along the liquid filled cylinder 111. Sound waves traveling along the tube 97 are directed into the base of the cylinder 111 so as to traverse the liquid in the cylinder 111 to the root of the reflector or horn 114. It will thus be seen that the resultant sound waves in the cylinder 111 combine and may be effectively moved back and forth along the length of the cylinder 111, for example, as determined by the relative amplitudes of the waves transmitted by the wave guides 97 and 116. It will be appreciated that the material of the cylinder 111 is an open-celled structure so that the cylinder is in fact saturated with liquid to consequently transmit sound waves applied to either end thereof. The menbrane 112 seals the exterior of the cylinder so that the liquid is retained therein. The cylinder 111 may be formed of various different materials such as formed polyurethane or sponge rubber.

By the utilization of a multichannel probe such as the one illustrated in FIG. 9, it is possible to create particular effects or results in the subject because of the capabilities of locating and moving the effective location of sound waves to the body in two or more dimensions. A probe, such as that illustrated in FIG. 9, is intended for use internally of the body or might, for example, be placed in the armpit for the communication of particular types of audio messages to the brain without employing the ear. Alternatively this probe may be inserted in other orifices of the body for a variety of purposes such as briefly noted above.

Figure 10:
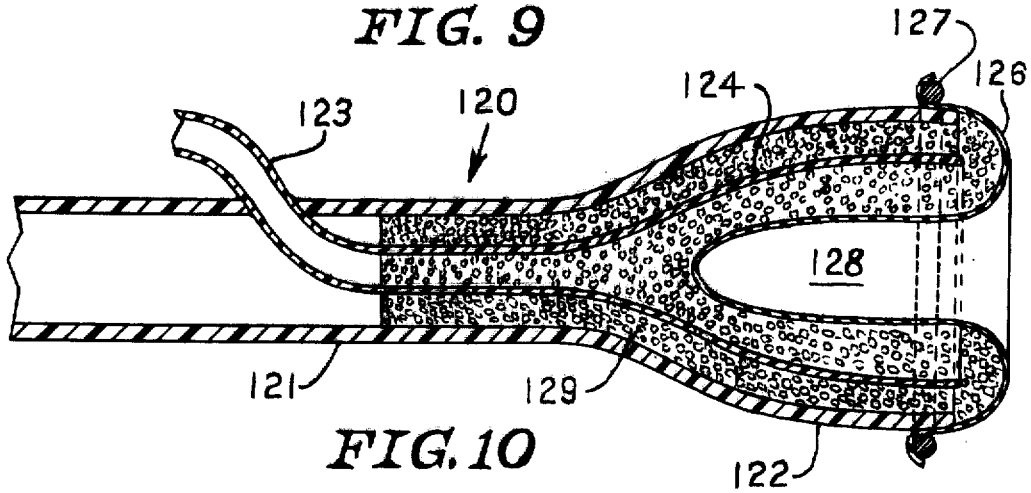
FIG. 10 is a central longitudinal sectional view of an external multichannel probe in accordance with the present invention.

It will be appreciated that multichannel probes adapted to receive two or more communication channels may be formed either as internal or external probes. In FIG. 10 there is illustrated an external multichannel probe 120 including a hollow cylinder 121 adapted for connection to a sound wave guide at one end thereof and flaring outwardly to an opposite open end. The flared portion 122 of the cylinder has somewhat of a cup shape. A hollow tube 123 extends through a side wall of the cylinder 121 and toward the open end thereof with the tube flaring outwardly, as indicated at 124, in much the same manner as the flared portion 122 of the cylinder 121. The outer end of the probe is closed by a membrane 126 formed, for example, of very thin multiply rubber in the form of an extensible cylindrical bag or the like with the base secured about the outer periphery of the flared cylinder portion 122 as by means of a retainer ring or the like 127. At least the outer end of the probe is provided with a cupt-shaped foamed material 129 about the flared tube end 124, as illustrated, so that the membrane 126 extends into the probe to form somewhat of a re-entrance structure such that the outer end of the probe includes a cylindrical axial indentation 128. If desired, there may be incorporated an annular reflector about the outer end of the probe inside of the membrane 126.

Considering operation of the probe of FIG. 10, it will be seen that, with audio waves traveling through the cylinder 121 and tube 123, these waves will meet at the outer end of the probe and by suitable modulation thereof may be combined in desired manner to produce the effect, for example, of a sound wave traveling back and forth along the cup-shaped outer end of the probe. This probe may, for example, be employed by inserting a finger into the opening 128 so that multichannel messages may be applied to the skin of the finger and it may be desirable to employ a light lubricant on the finger to improve acoustic coupling between probe and skin.

Although the present invention has been described with respect to particular preferred embodiments thereof, it will be appreciated by those skilled in the art that various modifications and variations may be made and consequently it is not intended to limit the present invention to the details of description or illustration and it is intended that the invention shall be considered in the light of the true scope thereof.

What is claimed is:

1. An audiotactile communications system comprising,
   a source of electrical signals,
   a transducer connected to said source of electrical signals and producing sound waves from said signals in a substantially sound-proof container,
   a sound wave guide coupled into said container for transmitting said sound waves along said guide, and
   probe means connected to said guide for receiving sound waves therefrom and having at least one sound pervious portion for coupling sound therefrom into a life form.

2. The system of claim 1 further defined by said source of electrical signals comprising a recorder/reproducer producing electrical signals representing recording.

3. The system of claim 1 further defined by said audiotactile transducer comprising a unit including a flexible diaphragm moved by an electrically energized coil from said synthesizing means mounted by vibration isolation means within a substantially sound-proof housing and coupled to said sound wave guide extending into the housing for transmitting sound waves generated by the diaphragm to said probe.

4. The system of claim 1 further defined by said unit being mounted upon an apertured baffle plate carried by mounting bars secured to the housing interior and connected through vibration isolation mounts to the baffle plate, said diaphragm being disposed adjacent said baffle plate aperture and a hollow conduit extending from said baffle plate aperture to an aperture in said housing at which said sound wave guide is secured for coupling sound waves into said wave guide with a minimum of sound transmission in other directions.

5. The system of claim 1 further defined by said unit including a container having said diaphragm sealing the top thereof and an impedance-matching horn extending from the top of the container into communication with said sound wave guide within said housing, a plurality of flexible fibers suspending said container and horn within said housing for minimizing sound transmission to said housing, and sound transmitting material disposed in said sound wave guide and horn above said diaphragm for transmitting audio waves to said probe.

6. The system of claim 5 wherein said sound transmitting material is a liquid.

7. The system of claim 1 further defined by a second audiotactile transducer connected to a second source of electrical signals and producing sound waves therefrom in a substantially sound-proof container and having a second sound wave guide extending to said probe for multichannel sound wave application to a human body.

8. A multichannel internal body probe for an audiotactile communication system transmitting sound waves through at least two liquid filled sound wave guides comprising a porous cylinder closing the end of a first of said wave guides and extending therefrom with a curved reflector on the outer end of the cylinder, a flexible liquid-tight membrane covering said cylinder and said second wave guide extending axially through said cylinder from the inner end thereof and terminating near the middle convex surface of said curved reflector whereby sound waves from the two guides traverse the porous cylinder material in opposite directions for coupling through said membrane into the human body.

9. An audiotactile communication system comprising
   a source of electrical signals,
   synthesizing means connected to said source and producing therefrom message signals of a low fundamental frequency,
   a transducer connected to said synthesizing means and producing sound waves from said message signals in a substantially sound proof container,
   a sound wave guide coupled into said container for transmitting said sound waves along said guide, and
   probe means connected to said guide for receiving sound waves therefrom and having at least one sound pervious portion for coupling sound therefrom into a life form.

10. The system of claim 9 further defined by said probe having an elongated substantially cylindrical configuration dimensioned to fit within an orifice of the human body.

11. The system of claim 9 further defined by said transducer further comprising vibration isolation means mounting and electrically driven diaphragm within said container with sound absorbing material about said electrically driven diaphragm for minimizing sound transmission from said container.

12. The system of claim 9 further defined by
   a second source of electrical signals,
   a second synthesizing means connected to said second source or electrical signals and producing therefrom second message signals,
   a second transducer connected to said second synthesizing means and producing second sound waves from said second message signals,
   a second sound wave guide coupled to said second transducer for transmitting said second sound waves along the second guide, and
   said probe means being connected to both of said sound wave guides for coupling multichannel sound into a life form.

13. The system of claim 12 further defined by said probe comprising
   a cellular cylinder extending from an end of the first wave guide and having a concave sound reflector at the outer end thereof, and
   a tube extending from the end of said second wave guide axially of said cellular cylinder with an open end directed toward and spaced from said reflector
   whereby sound waves from said two wave guides combine in said cylinder for coupling to a life form contacted thereby.

14. The system of claim 9 further defined by an oscilloscope connected to the input and output of said synthesizer for visual display and analysis of the message at the time of use.

* * * * *